United States Patent [19]

May, III et al.

[11] Patent Number: 5,252,008

[45] Date of Patent: Oct. 12, 1993

[54] GRANULAR MATERIAL TRANSFER SYSTEM

[75] Inventors: Peter P. May, III; Daniel T. Harnish, both of Carlsbad, Calif.

[73] Assignee: Autoload, Inc., Carlsbad, Calif.

[21] Appl. No.: 859,147

[22] Filed: Mar. 27, 1992

[51] Int. Cl.⁵ ............................................. B65G 53/66
[52] U.S. Cl. ...................................... 406/23; 406/34; 406/153; 406/173; 209/39; 209/215; 209/223.1
[58] Field of Search .................. 406/23, 21, 34, 153, 406/171, 173, 168, 175; 209/39, 636, 215, 223.1

[56] References Cited

U.S. PATENT DOCUMENTS

| | | | |
|---|---|---|---|
| 349,422 | 9/1886 | Bartlett | 209/223.1 |
| 3,239,278 | 3/1966 | Mueller et al. | 406/153 X |
| 4,235,563 | 11/1980 | Hine et al. | 406/171 X |
| 4,306,970 | 12/1981 | Tanaka et al. | 209/223.1 X |
| 4,379,663 | 4/1983 | Allison | 406/23 |
| 4,411,388 | 10/1983 | Muck | 406/153 X |
| 4,411,389 | 10/1983 | Harrison | 406/153 X |
| 4,599,016 | 7/1986 | Medemblik | 406/173 X |
| 4,812,086 | 3/1989 | Kopernicky | 406/153 |
| 4,834,586 | 5/1989 | Depew | 406/23 X |

FOREIGN PATENT DOCUMENTS

440160  9/1972  U.S.S.R. .................. 209/39

Primary Examiner—David M. Mitchell
Assistant Examiner—Gary C. Hoge
Attorney, Agent, or Firm—Wagner & Middlebrook

[57] ABSTRACT

A material transfer system for loading lightweight granular plastic material into injection molding machines and the like includes a reservoir sight glass assembly connected to the associated machine and a lightweight pressure relief chamber attached to the reservoir sight glass assembly, both connections being by quick disconnect devices. The reservoir sight glass assembly includes, a sensor which responds to the level of material in the sight glass and a magnet assembly which traps ferrous contaminates and prevents their entering the machine. The flow of material to the pressure relief chamber is controlled by the sensor which turns a regulated source of compressed air on or off depending upon the level of material in the sight glass. The air source is connected to an accelerator and vortex unit which is, in turn, connected to a source of the material. When air is supplied to the accelerator and vortex unit, it is injected into the downstream side of a venturi causing a vacuum which pulls the material into the air stream and then carries it to the pressure relief chamber. To avoid packing and caking of the fines at the throat of the venturi, a small reverse air flow jet is included to provide some turbulence at the venturi input.

19 Claims, 5 Drawing Sheets

GRANULAR MATERIAL TRANSFER SYSTEM

BACKGROUND OF THE INVENTION

This invention relates to a loading system for a material processing machine and more particularly to a system for transferring granular plastic materials into processing machines such as injection molding machines, extruders, blow molding machines and material dryers.

Machines for loading granular plastic materials into injection molding machines and the like have been available for a considerable period of time. Such machines normally include a large hopper assembly placed on top of injection molding machines and the like, making them very difficult to maintain and service.

In addition to the hopper, means are required for loading the hopper, normally an electrically driven vacuum motor. A number of problems have become manifest in the use of such machines. Typically the vacuum motor is very noisy, consumes considerable electricity and is dirty in that it blows fines of the material into the atmosphere. Such motors also require brushes that frequently wear out and have to be replaced. Frequently the machines currently in use also require expensive filter systems that have to be cleaned and replaced often. It is not unknown for such systems to become partially or entirely plugged, making it necessary to clean them out. They also have to be cleaned out after each run of a particular material to keep contamination to a minimum. Where such systems are on top of large hoppers on top of injection molding machines and the like, it becomes necessary for someone to climb up on the machine to effect the cleaning or maintenance. Sometimes machine components are broken, materials are spilled and wasted, or people are injured in falls in the course of effecting such cleaning because of the inaccessibility of such systems. It is, therefore, an object of the present invention to provide a loading system in which the loading process is considerably simplified and in which components for cleaning are readily accessible and easily handled from the floor.

Another area in which prior art machines appear to be unsatisfactory is that the various parts are not easily disassembled for cleaning. It is an object of the present invention to provide a material loading system in which the components are quickly and easily disassembled for cleaning by means of slip fit joints with O-ring seals.

Because of the fact that metal fragments and components sometimes find their way into the material it is known to provide a magnetic field somewhere in the system to trap such fragments and components. Disassembly to remove such metal fragments and components has generally involved a considerable expenditure of time. It is another object of the present invention to provide a material loading system including magnetic means in which the arrangement for removing such metal fragments and components is substantially facilitated.

Where there is an air driven system for transferring the granulated materials to the hopper from sources such as bags or barrels, it is frequently found that the conduit from the source to the hopper becomes plugged with material, frequently from packing and caking of the fines and/or chunks of material in the supply. It is therefore a further object of the present invention to provide an improved air driving system which is much less susceptible to such plugging.

In some applications it is desired to supply to the injection molding machine or the like, a mixture of two different kinds of such granular materials such as virgin plastic and regrind plastic. The usual system for accomplishing this mixture will load the virgin plastic for a few seconds and then load the regrind plastic for a few seconds. This builds up stratified layers of the separate materials in the hopper which causes process conditions to change from part to part and sometimes within the same part. As a result, the quality of the parts produced will vary, sometimes to an unacceptable degree. It is, therefore, a further object of the present invention to produce a material loading system in which a plurality of different granular materials can be supplied and blended together before being supplied to the associated machine.

Other objects and advantages will become apparent from consideration of the following specification taken in combination with the accompanying drawings.

BRIEF DESCRIPTION OF THE INVENTION

Applicants have designed a material transfer system particularly for handling granular plastic materials which are supplied to machines such as injection molding machines and the like, but which can also convey and load other lightweight granular materials, which meets the above objectives. By using a comparatively small lightweight pressure relief chamber combined with a reservoir sight glass assembly attached to each other with a slip fit quick disconnect means having O-rings sealing the joint, and with the sight glass assembly similarly connected to the machine mounting plate of the associated machine, removal and replacement for cleaning of both the pressure relief chamber and the reservoir sight glass assembly is facilitated. The filter unit which forms part of the pressure relief chamber is similarly easy to remove and olean and/or replace as required.

Applicants have provided an improved air driven material acceleration unit which, in addition to being quite efficient at moving material from a source such as a barrel or shipping container, also includes a separate air passage creating a certain amount of turbulence at the input to said unit which has proved effective in inhibiting the blocking or plugging of the unit by fines and/or large chunks in the material.

Applicant's loading system also includes a very simple magnetic structure attached to the reservoir sight glass assembly which creates a magnetic field across the assembly and which is effective to trap ferrous metal objects which might otherwise damage the associated machine. By using simple manually pivotable magnetic members, the magnetic field is easily interrupted to permit the metallic objects to be released from the reservoir sight glass assembly while it is removed from the machine mounting plate for cleaning.

Also attached to applicants' reservoir sight glass assembly is a sensor which effectively looks through the reservoir sight glass and distinguishes whether material is present in the reservoir sight glass assembly. This sensor is adjustable as to its level on the reservoir sight glass assembly and so can determine the starting charge of material and load the needed charge of material for the associated machine automatically. This also avoids the need for supplying a large hopper since the system can respond quickly to supply the amount of material needed to be supplied to the associated machine for each machine cycle.

BRIEF DESCRIPTION OF THE DRAWING

This invention may be more clearly understood from the following detailed description and by reference to the drawing in which.

DETAILED DESCRIPTION OF THE INVENTION

Figures 1, 3:
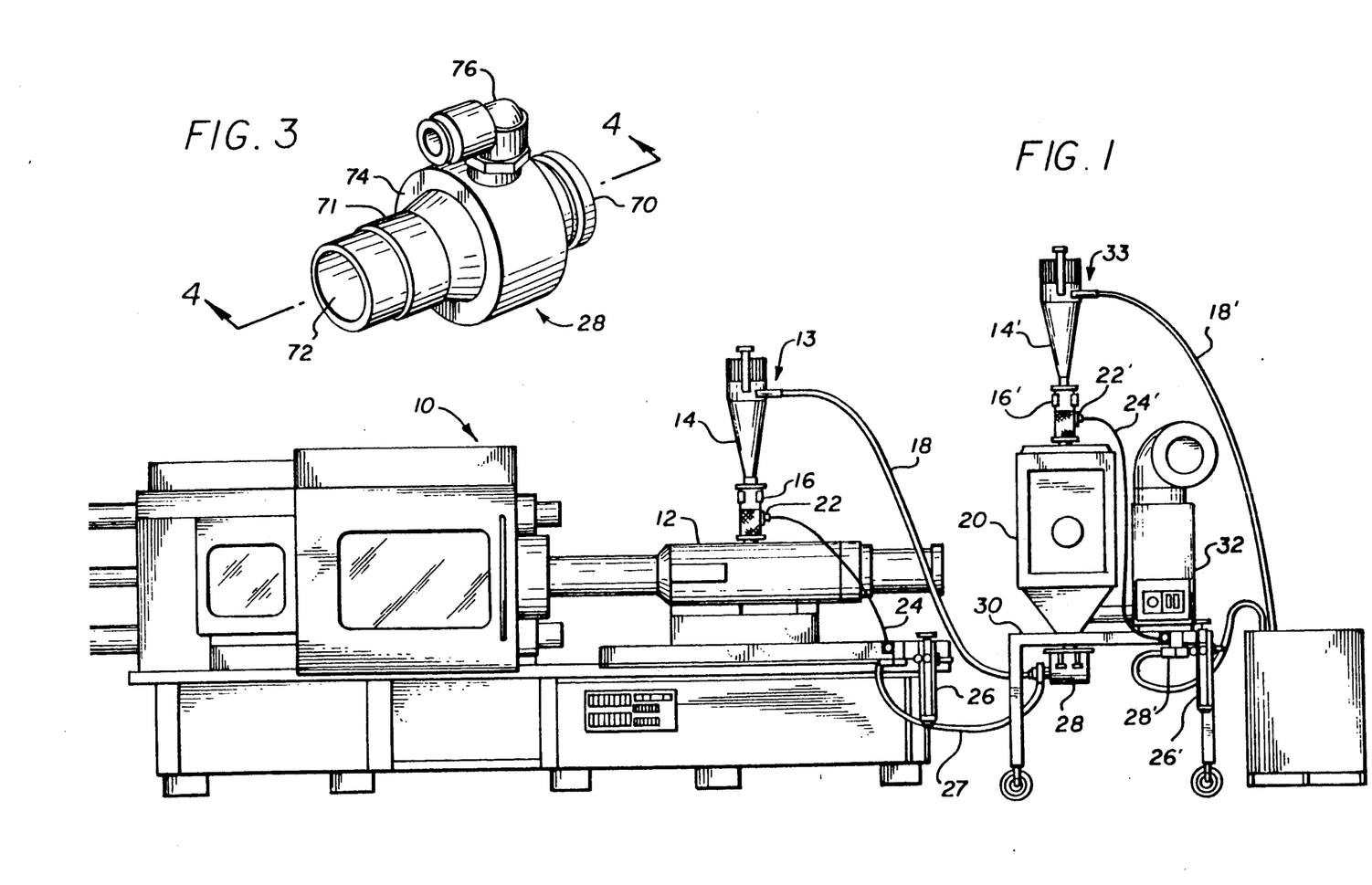
FIG. 1 is a side view of an injection molding machine including material loading systems incorporating our invention.
FIG. 3 is a perspective view of the accelerator tube and vortex unit shown in FIGS. 1 and 2.

Referring to FIG. 1, an injection molding machine is shown at numeral 10 having an input chamber or throat 12 for receiving a desired amount of granular plastic material for each cycle of its operation. Connected to the input chamber or throat 12 is a loading system 13 including a pressure relief chamber 14 and a reservoir sight glass assembly 16 which receives material from the pressure relief chamber. A conduit 18 carries plastic material from a source, which in this case is a dryer 20, to a tangential inlet duct 21 on the pressure relief chamber 14. A sensor 22 fastened to the side of the reservoir sight glass assembly 16 is connected through an insulated wire 24 to an air pressure regulator 26 which controls the supply of air to an accelerator and vortex unit 28. Air supplied to the regulator 26 from a source, not shown, is controllable supplied, through an air hose 27 to accelerator and vortex unit 28. Material from dryer 20 is caused to flow by air pressure, through the acceleration and vortex unit 28 and through conduit 18 to the pressure relief chamber 14. When the material supplied reaches a desired level in reservoir sight glass assembly 16, this is sensed by sensor 22 which sends a signal to the air pressure regulator to shut off the air supplied through air hose 21 to the acceleration and vortex unit 28.

The dryer 20 which is carried on a separate cart 30, includes a blower and heating unit 32. Mounted on the top of dryer 20 is a second loading system 33 which includes a pressure relief chamber 14' and a reservoir sight glass assembly 16'. Transfer system 33 is essentially identical to transfer system 13 wherein identical parts will be given the same numerals plus a prime. A container 34 containing a supply of plastic granules is connected through a conduit 18' to pressure relief chamber 14'. Carried on cart 30 is an air pressure regulator 26' connected to an air pressure source (also not shown), to a sensor 22' on reservoir sight glass assembly 16' through a wire 24', and to an accelerator and vortex unit 28'. As described above, the sensor 22' on reservoir sight glass assembly 16' responds to the level of granulated plastic material in the reservoir sight glass assembly to cause air pressure regulator 26' to either supply air to the accelerator and vortex unit 28' to cause material to flow through conduit 18' to pressure relief chamber 14' or to shut off the supply of air and, hence, the flow of material to pressure relief chamber 14'. FIG. 1 shows a system in which two of my loading systems are shown connected in series. Details of one such system are discussed below.

Figure 2:
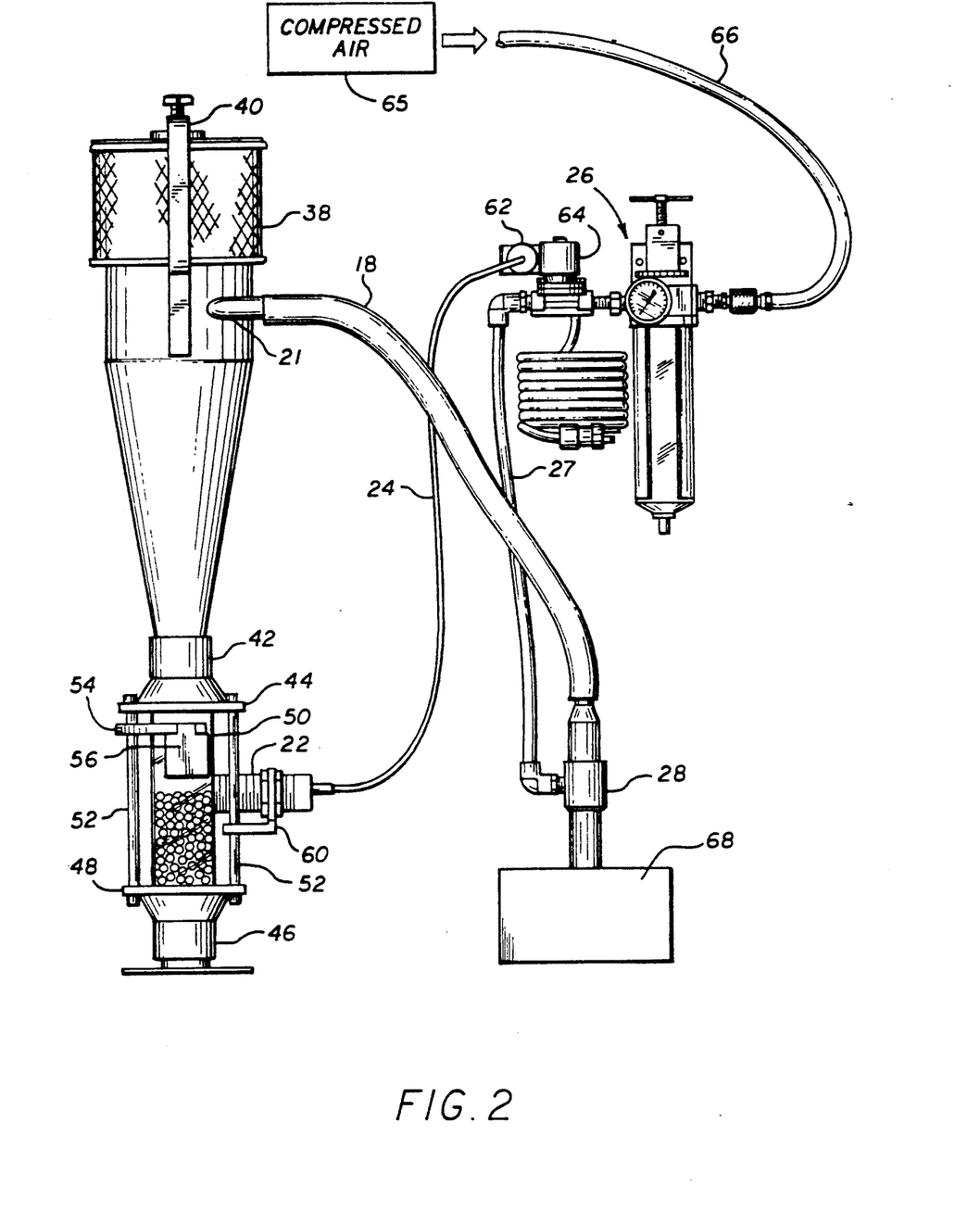
FIG. 2 is an enlarged side view of one of the material loading systems of FIG. 1.

FIG. 2 is an enlarged view showing part of loading system 13 in greater detail including pressure relief chamber 14 and reservoir sight glass assembly 16. The tangentially attached inlet duct 21 to which conduit 18 is attached is shown, as well as a filter unit 38 at the upper end of pressure relief chamber 14. A fastening bracket 40 provides means for securing and removing the filter unit 38.

Reservoir sight glass assembly 16 includes an upper end bell member 42 including a flange 44, a lower end bell member 46 including a flange 48, a sight glass 50 secured between the flanges and four support rods 52 which cooperate with a plurality of screws 53 (see FIG. 7) to hold the flanges 44 and 48 and reservoir sight glass 50 together. Secured to two of rods 52 is a magnetic unit including a bracket 54 and a pair of magnetic members 56, 58 (of which only member 56 is visible in this view) pivotally attached to bracket 54. A sensor 22 is fastened to the side of reservoir sight glass 50 by means of a bracket 60 adjustably secured to a pair of support rods 52 to control the level of material in the sight glass 50. Sensor 22 is connected through wire 24 to a switch 62 operating an air valve 64 forming part of air pressure regulator 26 which is connected to a source of compressed air through a hose 66. Air hose 27 is connected between air valve 64 and accelerator and vortex unit 28. At its opposite end from its connection to conduit 18, accelerator and vortex unit 28 is connected to a source of granular plastic material 68, which may be a barrel or other suitable container.

FIG. 3 is a perspective drawing of the accelerator and vortex unit 28, which includes a pipe 71 having an inlet port 70 connected to source 68 of granular plastic material and an outlet port 72 to which conduit 18 is connected. Pipe 71 has a slightly expanded diameter at its center covered with a collar 74 to which is attached an elbow 76. Air hose 27 is attached to elbow 76.

Figure 4:
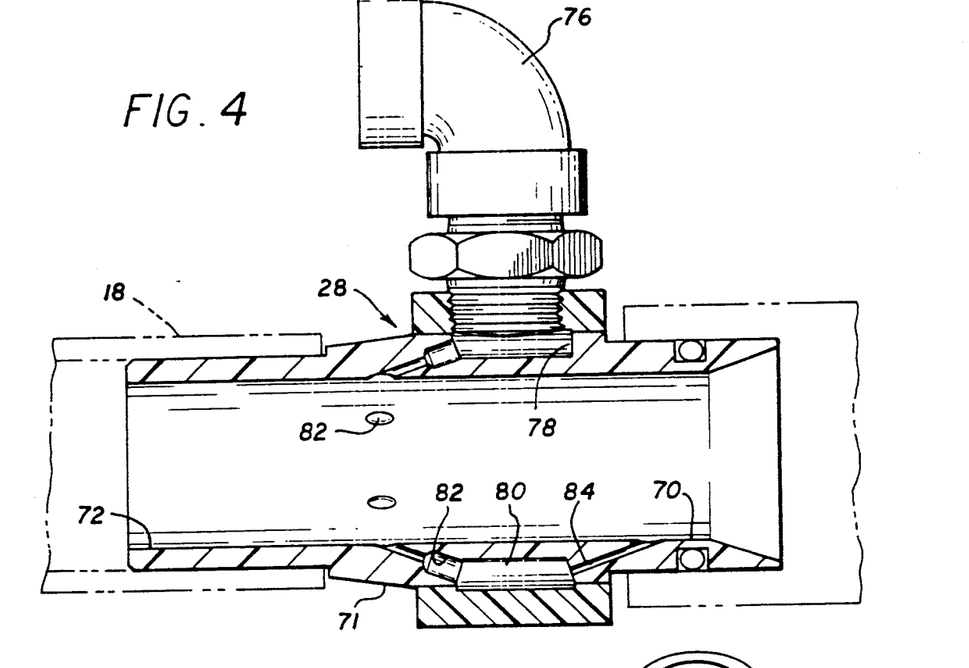
FIG. 4 is a sectional drawing taken along line 4—4 of FIG. 3.

FIG. 4 is a sectional view taken along line 4—4 of FIG. 3. In this view it will be seen that the collar 74 covers an annular groove 78 on the surface of pipe 71 forming an annular chamber 80 communicating with the interior of elbow 76. Chamber 80 communicates with a series of passages 82 directing air toward outlet port 72. From inlet port 70 to the outlets of passages 82 is a venturi.

When air under pressure is supplied from regulator 26 through air hose 27 to the accelerator and vortex unit 28, a vacuum is created upstream of passages 82 which pulls the lightweight granular material from source 68 and causes it to flow through conduit 18 to pressure relief chamber 14. While the unit, as described, does operate, it has been found that over time, the fines and chunks of material have tended to collect and pack together near the inlet port 70. Applicants have provided a passageway 84 substantially smaller than the passage 82 which directs a small jet of air into the throat of the venturi to cause just enough turbulence at that point to inhibit and substantially prevent this packing together of the material.

Figures 5, 7:
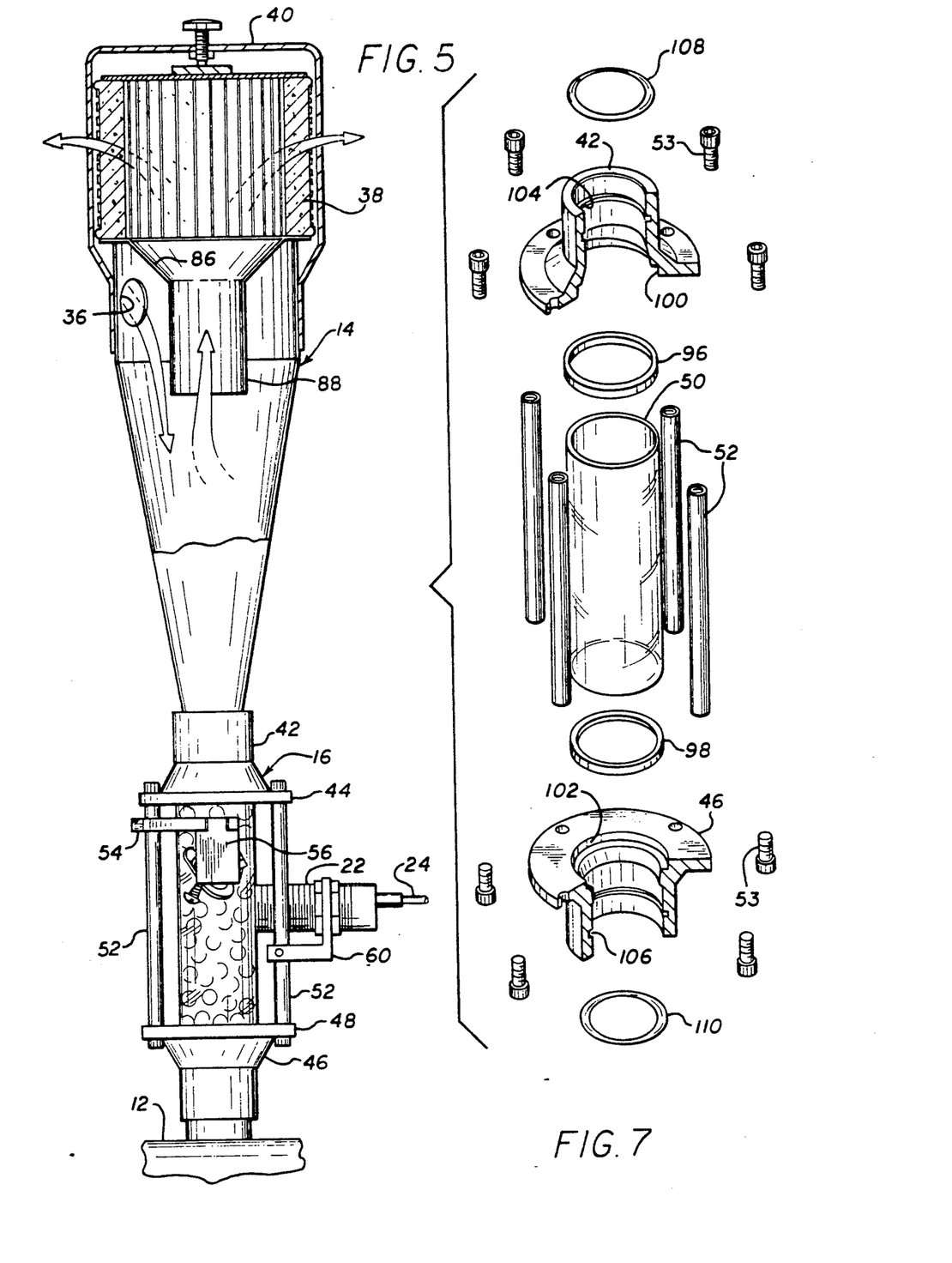
FIG. 5 is a further enlarged view, partly in section, of part of the structure of FIG. 2.
FIG. 7 is an exploded view, partly in section, of the reservoir sight glass assembly of FIGS. 2 and 5.

FIG. 5 is a view of the pressure relief chamber 14 and reservoir sight glass assembly 16 shown partially in section and somewhat enlarged from the showing of FIG. 2. In this view the port 36 of the tangential inlet duct 21 is shown in the sidewall of pressure relief chamber 14. An interior cone 86 and a cylindrical baffle 88 formed in the top of pressure relief chamber 14 cause the flow from port 31 to be directed downwardly as shown by the arrow. In general the air flow will carry all the solids toward the bottom of the pressure relief chamber and into reservoir and sight glass assembly 16. Since the air must escape however, it flows through the passage at the center of baffle 88 and radially outwardly through the filter unit 38. Inevitably some fines will be carried by this air flow and they are blocked by the filter from escaping into the atmosphere. The filter 38 is readily removable for cleaning by loosening the screw on bracket 40 and sliding the filter laterally.

In this view of the reservoir sight glass assembly 16, the magnetic members 56 and 58 (only member 56 is visible in this view) are shown in the lowered position in which they create a significant magnetic field across the reservoir sight glass. A number of magnetic members such as a paper clip, a screw and a washer are shown held in this magnetic field.

Figure 6:
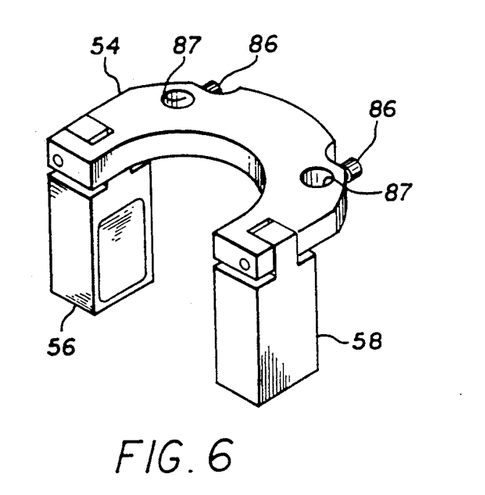
FIG. 6 is a perspective view of a magnetic unit used in association with the machine of FIGS. 2 and 5.

The purpose of the magnetic members 56, 58 is to create a field in which ferrous metal contaminants may be caught and prevented from entering the associated machine. FIG. 6 is a perspective view of the magnetic assembly alone with members 5 and 58 shown in the lowered position creating a strong magnetic field between these members. Magnetic members 56 and 58 are pivotally attached to bracket 54. This view also shows screws 86 which are turned inward to secure the magnetic assembly to support rods 52 which pass through bores 87 in bracket 54.

An exploded view of the reservoir sight glass assembly 16 is shown in FIG. 7 with the sensor and the magnetic unit removed In this view it will be observed that the assembly consists of a sight glass tube 50 which is secured between upper and lower end bell members 42 and 46 respectively. Circular seal members 96 and 98 are positioned between the sight glass tube 50 and end bell members 42 and 46, respectively. A plurality of support rods 52 are bolted to the upper and lower end bell members 42,46 by means of a plurality of screws 53. In addition to grooves 100,102 for receiving seals 96 and 98 respectively, end bell members 42 and 46 include internal grooves 104 and 106, which receive O-rings 108 and 110 respectively and which provide an air tight seal against the lower end of the pressure relief chamber 14 and a fitting (not shown) on a mounting plate of the machine input chamber 12. Those skilled in the art will quickly recognize that with the reservoir sight glass assembly connected as described, the pressure relief chamber 14 may be easily disconnected from the top of the reservoir sight glass assembly 16 and the sight glass assembly is similarly easy to remove from the associated machine.

Figure 8:
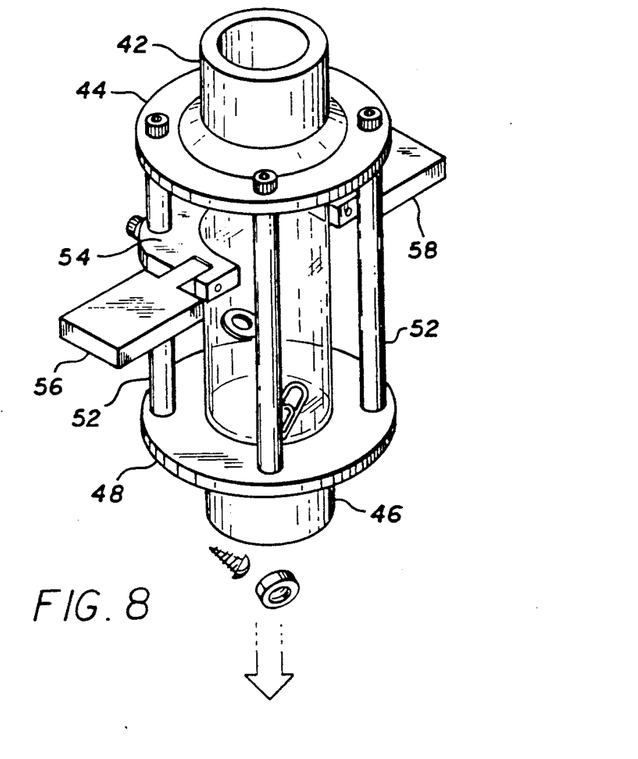
FIG. 8 is a perspective view of the reservoir sight glass unit of FIGS. 2 and 5 with the magnetic unit of FIG. 6 shown in an alternate position.

FIG. 8 is a perspective drawing of reservoir sight glass assembly 16 (with the sensor 22 removed) which is attached to pressure relief chamber 14 and to the input chamber or throat 12 of the machine 10 by the quick disconnect slip fit, O-ring sealed joints described above. When the view through the sight glass indicates that there are undesirable ferrous metal objects in the magnetic field between magnetic members 56 and 58, this assembly 16 may readily be removed (after shutting off the air supply) and the magnetic members 56 and 58 manually pivoted to the horizontal position shown which effectively removes the magnetic field, permitting the metallic objects, shown here as a washer, a paper clip, a screw and nut, to simply drop out of the assembly. At this point the pressure relief chamber 14 itself is readily disassembled for cleaning, if desired. The reservoir sight glass assembly 16 may then be quickly reattached to the pressure relief chamber 14 and throat 12, the air supply again turned on, until the level of material in the reservoir sight glass sensed by the sensor 22 is at the point where the sensor 22 will cause the air pressure regulator 26 to discontinue supplying more material to the pressure relief chamber 14.

From the foregoing it will be appreciated that the material loading system described herein affords some significant advantages over earlier systems presently in use. By using quick disconnect slip fit fittings with O-rings to connect the reservoir sight glass assembly 16 to the throat 12 and the pressure relief chamber 14, both the pressure relief chamber and reservoir sight glass assembly are easily removed, cleaned and replaced in the system. The pressure relief chamber 14 and the reservoir sight glass assembly 16 are relatively small and easily handled from the floor level so there is no need to climb up on the associated machine. By locating the magnetic members on the reservoir sight glass assembly, magnetic objects in the reservoir sight glass are easily seen, identified and removed. And the accelerator and vortex unit employed is quite effective to move the material from the source to the pressure relief chamber 14 without incurring the blockage caused by packing and caking of the material at the inlet port 70 which has been experienced in the past.

Figure 9:
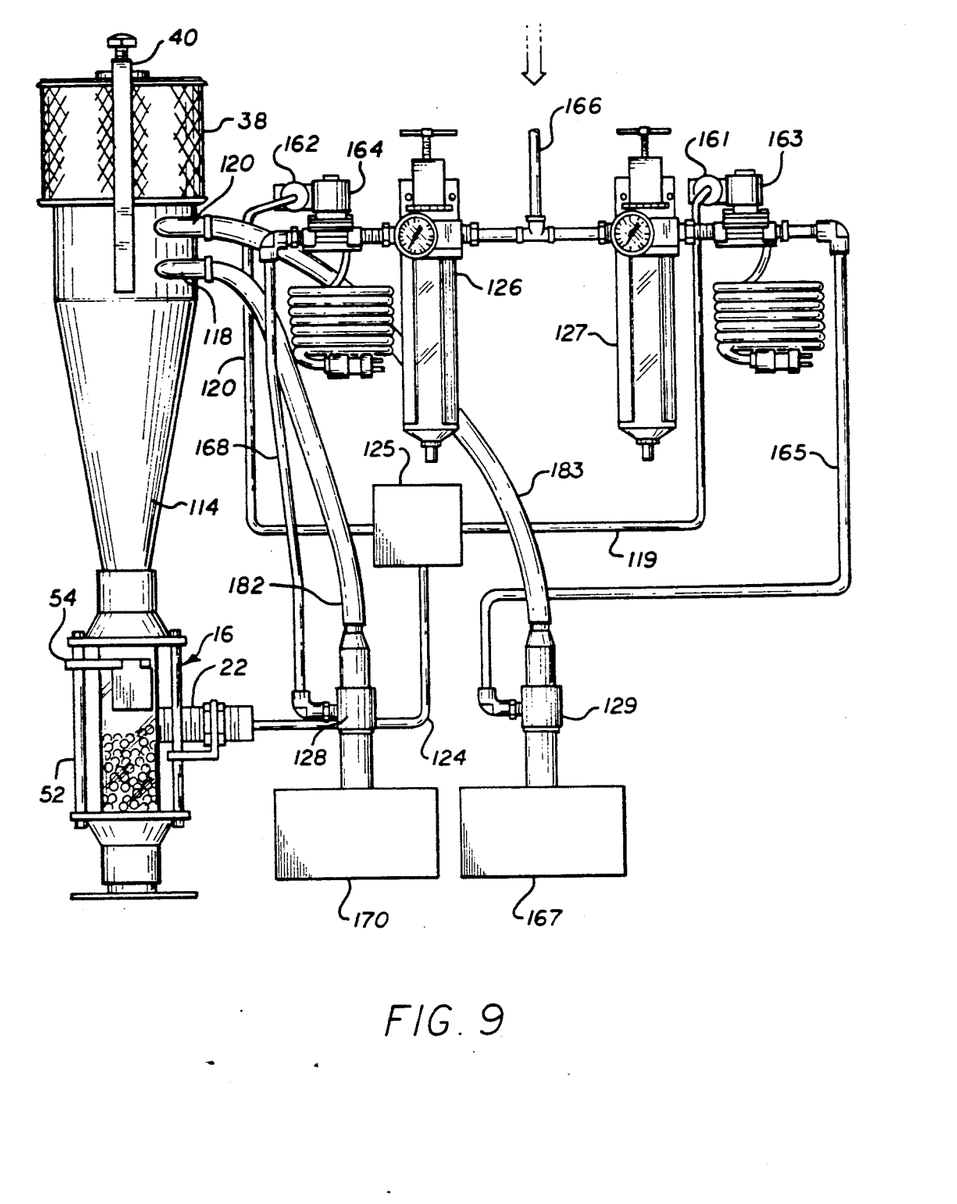
FIG. 9 is a side view of an alternate embodiment of the invention.

An additional embodiment of our invention is shown in FIG. 9. There are often circumstances wherein it is desired to supply the associated machine with a mix of different granular materials. One such situation occurs when it is desired to produce molded plastic parts from a mix of regrind plastic and virgin plastic. As described above, the usual current procedure is to supply a hopper with regrind plastic for a few seconds followed by virgin plastic for a few more seconds, repeating the process over and over. One problem with such a system is that the material builds up in the hopper in a series of stratified layers of different kinds of plastic which results in variations in the plastic content from part to part or within the same part.

In the embodiment of FIG. 9, the pressure relief chamber 114 is essentially the same as chamber 14, the filter structure is the same, and the difference is that there are two tangentially directed inlet ducts 118 and 120 fastened to the upper end of chamber 114. Chamber 114 is attached to the reservoir sight glass assembly 16 as described above. Attached to rods 52 of the assembly 16 are a sensor 22 and a magnetic assembly 54, both of which may be identical to the similar parts described above with respect to FIGS. 2 and 5. Sensor 22 is connected through a wire 124 to a control box 125 which receives signals from sensor 22 as described and transmits "on" or "off" signals through wires 119 and 120 simultaneously to each of two switches 161 and 162 respectively. Switch 161 controls operation of an air valve 163 forming part of an air pressure regulator 127 connected to a source of compressed air through a hose 166. An air hose 165 is connected between air valve 161 and an accelerator and vortex unit 129 which is connected to a source of granular plastic material 167, which may; for example, be a barrel containing regrind plastic.

Similarly, switch 162 controls operation of an air valve 126 connected to the air source at hose 166. Air valve 126 controls air flow through a hose 168 to an accelerator and vortex unit 128 which is connected to a source of granular plastic material 170 which may, for example, be a container containing virgin plastic material.

When sensor 22 "sees" material at the desired level in the sight glass, no signal is sent through wire 124 and, hence, no signal to switches 161 and 162, and no material flows through the passages 182 and 183 to the pressure relief chamber 114. When the material in the sight glass drops below the desired level, the sensor 22 sends a signal through wire 124 to control box 125 which relays the signal to both of switches 161 and 162, actuating switches 163 and 164. This causes air under pressure to be delivered simultaneously to both of the accelerator and vortex units 128 and 129 producing an essentially identical quantity of flow of plastic material through passages 182 and 183 to inlet ducts 118 and 120. This results in an even mix of regrind and virgin plastic in chamber 114 and supplied to reservoir and sight glass assembly 16. Should a different proportion of materials be preferred, this may be effected by varying the air pressure by adjusting regulators 126 and 127 as desired.

The above described embodiments of the present invention are merely descriptive of its principles and are not to be considered limiting. The scope of the present invention instead shall be determined from the scope of the following claims including their equivalents.

We claim:

1. A material transfer system for processing machine having an input chamber for receiving measured quantities of granular materials from a source of said materials comprising:
   means mounted on said machine including a pressure relief chamber and a reservoir assembly, said reservoir assembly including a level sensor;
   said pressure relief chamber including a conical section connected at its smaller end to said reservoir assembly, a filter at the opposite end of said chamber, an inlet conduit connected tangentially to said pressure relief chamber adjacent said opposite end, and an internal baffle deflecting flow from said inlet conduit toward said smaller and including an internal passage communicating said smaller end with said filter;
   an accelerator tube and vortex unit connected to said conduit and to said source, a source of air under regulated pressure, and means supplying said air to said accelerator tube and vortex unit to cause said granular materials to flow through said conduit, said accelerator tube and vortex unit including a pipe with a venturi therein, a plurality of passages connecting said air supply means to the downstream side of said venturi and a smaller passageway connecting said air supply means to said venturi upstream of said plurality of passages; and
   control means responsive to said sensor for controlling the flow of said air.

2. A material transfer system as claimed in claim 1 wherein magnetic means is attached to said reservoir assembly, said reservoir assembly includes a, said magnetic means includes a pair of magnetic members positioned to create a magnetic field across said sight glass.

3. A material transfer system as claimed in claim 1 wherein said input chamber includes an input port, said reservoir assembly includes a sight glass and upper and lower end bells, and means fastening said end bells to said sight glass, said end bells including cylindrical connecting members having internal grooves and O-rings in said grooves sealing against said smaller end of said conical section and said inlet port.

4. A material transfer system as claimed in claim 3 wherein said fastening means includes a plurality of support rods and threaded members securing said end bells to said support rods.

5. A material transfer system as claimed in claim 4 wherein said level sensor is supported on at least one of said support rods.

6. A material transfer system as claimed in claim 4 wherein a magnetic assembly is attached to at least one of said support rods, said assembly including a pair of magnetic members positioned to create a magnetic field across said sight glass.

7. A material transfer system as claimed in claim 1 wherein said source of materials includes first and second containers of granular materials of different kinds which it is desired to mix;
   said pressure relief chamber includes said first inlet conduit and a second inlet conduit connected tangentially to said chamber adjacent said opposite end;
   said first accelerator tube and vortex unit and a second accelerator tube and vortex unit are connected to said first and second containers and to said first and second inlet conduits respectively; and
   said air supply means is connected to each of said first and second accelerator tube and vortex units.

8. A material transfer system for processing machine having an input chamber for receiving measured quantities of granular materials from a source of said materials comprising:
   means mounted on said machine including a pressure relief chamber and a reservoir assembly, said reservoir assembly including a level sensor;
   said pressure relief chamber including a conical section connected at its smaller end to said reservoir assembly, a filter at the opposite end of said chamber, an inlet conduit connected tangentially to said pressure relief chamber adjacent said opposite end, and an internal baffle deflecting flow from said inlet conduit toward said smaller end including an internal passage communicating said smaller end with said filter;
   an accelerator tube and vortex unit connected to said conduit and to said source, a source of air under regulated pressure, and means supplying said air to said accelerator tube and vortex unit to cause said granular materials to flow through said conduit; and
   control means responsive to said sensor for controlling the flow of said air; and magnetic means attached to said reservoir assembly, said reservoir assembly including a sight glass, and a pair of magnetic members positioned to create a magnetic field across said sight glass, and a bracket, said magnetic members being pivotally connected to said bracket for pivoting said magnetic members to a position wherein there is no effective magnetic field across said sight glass.

9. A material transfer system for a processing machine having an input chamber including an inlet port for receiving measured quantities of material from a source of said material including means mounting said system on said machine adjacent said input port; said system comprising:
  a reservoir assembly fastened to said mounting means, said assembly including a reservoir sight glass and upper and lower end bells, means fastening said end bells to said sight glass, said end bells including cylindrical connecting members having internal grooves and O-rings in said grooves sealing against said smaller end of said conical section and said inlet port, a sensor located adjacent said reservoir sight glass, and magnetic means capable of forming a magnetic field across said reservoir sight glass;
  a pressure relief chamber including a conical section having its smaller end connected to said reservoir assembly, an inlet conduit connected tangentially adjacent the opposite end of said chamber, a filter at the opposite end of said chamber, and an internal baffle in said chamber effective to deflect flow from said inlet conduit toward said smaller end and having a central passage communicating said smaller end with said filter;
  an accelerator tube and vortex unit connected to said inlet conduit and to said source, a source of air under regulated pressure and means supplying said air to said accelerator or tube and vortex unit to cause said materials to flow through said conduit; and
  control means responsive to said sensor for controlling the flow of said regulated air.

10. A material transfer system as claimed in claim 9 wherein said accelerator tube and vortex unit includes a passage with a venturi therein, a plurality of ports connecting said air supply means to the downstream side of said venturi and smaller port means connecting said air supply means to said venturi upstream of said plurality of ports.

11. A material transfer system as claimed in claim 9 wherein magnetic means is attached to said reservoir assembly, and said magnetic means includes a pair of magnetic members positioned to create a magnetic field across said reservoir sight glass.

12. A material transfer system as claimed in claim 11 wherein magnetic means includes a bracket, said magnetic members are pivotally connected to said bracket, and means are provided for pivoting said magnetic members to a position wherein there is no effective magnetic field across said reservoir sight glass.

13. A material transfer system as claimed in claim 11 wherein quick disconnect devices are incorporated in said reservoir assembly to enable facile removal of said reservoir assembly form said machine.

14. A material transfer system as claimed in claim 13 wherein during removal of said reservoir assembly from said machine, means are provided for pivoting said magnetic members such that there is no effective magnetic field across said reservoir sight glass to release metal objects from said reservoir sight glass.

15. A material transfer system as claimed in claim 9 wherein said source of materials includes first and second containers of granular materials of different kinds which it is desired to mix;
  said pressure relief chamber includes first and second inlet conduits connected tangentially to said chamber adjacent said opposite end;
  said first accelerator tube and vortex unit and a second accelerator tube and a vortex unit are connected to said first and second containers and to said first and second inlet conduits respectively; and
  said air supply means is connected to each of said first and second accelerator tube and vortex units.

16. A material transfer system for a plastic materials processing machine having a throat for receiving said materials and means mounting said system on said machine at said throat, said system being connected to a source of said materials and comprising:
  a reservoir sight glass unit fastened to said mounting means, said unit including a reservoir sight glass, a sensor fastened to said unit against said reservoir sight glass and means for adjusting the level of said sensor relative to said reservoir sight glass, and magnetic means attached to said unit having a first position wherein a magnetic field is impressed across said reservoir sight, glass and a second position wherein there is no effective magnetic field across said reservoir sight glass;
  a pressure relief chamber fastened to the opposite end of said sensor and reservoir sight glass unit from said mounting means and including a vertical tapered chamber having its smaller end connected to said sensor and reservoir sight glass unit, inlet port means connected tangentially adjacent the upper end of said assembly, an internal baffle member in said assembly effective to deflect flow from said inlet port means downwardly and having a central passage and a filter at the upper end of said assembly communicating with said central passage including means for exhausting air;
  an accelerator tube and vortex unit connected to said source, a conduit connecting said accelerator tube and vortex unit to said inlet port, means supplying air under regulated pressure to said accelerator tube and vortex unit to cause said plastic materials to flow through said conduit; and
  control means responsive to said sensor for controlling the flow of said regulated air.

17. A material transfer system as claimed in claim 16 wherein said accelerator tube and vortex unit includes a pipe with a venturi therein, a plurality of passages connecting said air supply means to the downstream side of said venturi and a smaller passageway connecting said air supply means to said venturi upstream of said plurality of passages.

18. A material transfer system as claimed in claim 16 wherein magnetic means includes a bracket, said magnetic members are pivotally connected to said bracket, and means are provided for pivoting said magnetic members to a position wherein there is no effective magnetic field across said reservoir sight glass.

19. A material transfer system as claimed in claim 16 wherein quick disconnect devices are incorporated in said sensor and reservoir sight glass unit to enable facile removal of said sensor and reservoir sight glass unit from said machine.

* * * * *